US009400022B2

(12) United States Patent
Ajimoto

(10) Patent No.: US 9,400,022 B2
(45) Date of Patent: Jul. 26, 2016

(54) POWER TRAIN CONTROL DEVICE

(71) Applicant: Fuji Jukogyo Kabushiki Kaisha, Tokyo (JP)

(72) Inventor: Keisuke Ajimoto, Tokyo (JP)

(73) Assignee: FUJI JUKOGYO KABUSHIKI KAISHA, Tokyo (JP)

(*) Notice: Subject to any disclaimer, the term of this patent is extended or adjusted under 35 U.S.C. 154(b) by 5 days.

(21) Appl. No.: 14/557,875

(22) Filed: Dec. 2, 2014

(65) Prior Publication Data

US 2015/0159708 A1    Jun. 11, 2015

(30) Foreign Application Priority Data

Dec. 6, 2013  (JP) ................................. 2013-253589

(51) Int. Cl.
  *B60W 10/02* (2006.01)
  *F16D 43/30* (2006.01)
  *B60K 23/08* (2006.01)
  *B60W 10/04* (2006.01)

(52) U.S. Cl.
  CPC ............ *F16D 43/30* (2013.01); *B60K 23/0808* (2013.01); *B60K 41/22* (2013.01); *B60K 2023/085* (2013.01); *B60K 2023/0816* (2013.01); *B60W 10/02* (2013.01); *Y10T 477/635* (2015.01); *Y10T 477/6352* (2015.01); *Y10T 477/641* (2015.01)

(58) Field of Classification Search
  CPC ............... B60K 41/22; B60K 23/0808; B60K 2023/0816; B60K 2023/085; Y10T 477/635; Y10T 477/6352; Y10T 477/641; B60W 10/02
  USPC .................... 701/69; 477/62, 64, 79
  See application file for complete search history.

(56) References Cited

U.S. PATENT DOCUMENTS

| 5,069,305 | A | * | 12/1991 | Kobayashi | ......... | B60K 23/0808 180/249 |
| 2006/0241842 | A1 | * | 10/2006 | Houtman | ............. | B60K 17/342 701/69 |
| 2009/0250283 | A1 | * | 10/2009 | Ghoneim | ........... | B60K 23/0808 180/233 |
| 2012/0202648 | A1 | * | 8/2012 | Kikura | ................. | B60W 10/02 477/87 |
| 2012/0234134 | A1 | * | 9/2012 | Oki | ...................... | B60W 10/02 74/665 A |
| 2014/0129105 | A1 | * | 5/2014 | Shigeta | .................. | B60K 17/35 701/69 |
| 2014/0231165 | A1 | * | 8/2014 | Hori | ......................... | B60L 7/12 180/242 |
| 2015/0191082 | A1 | * | 7/2015 | Ikushima | ........... | B60K 23/0808 180/249 |

FOREIGN PATENT DOCUMENTS

| JP | EP 1188596 A2 | * | 3/2002 | ......... B60K 23/0808 |
| JP | 2005-083492 | | 3/2005 | |

* cited by examiner

Primary Examiner — Roger Pang
(74) Attorney, Agent, or Firm — Smith, Gambrell & Russell, LLP

(57) ABSTRACT

A power train control device includes: an automatic neutral clutch that adjusts driving force transmitted from an engine to a transmission mechanism constituting an automatic transmission; a transfer clutch that adjusts driving force transmitted from the transmission mechanism constituting to a driving system component which drives driven-wheels; an automatic neutral clutch control unit that releases the automatic neutral clutch if predetermined automatic neutral control conditions are satisfied; and a transfer clutch control unit that controls engaging force of the transfer clutch based on a running state of a vehicle equipped with the power train control device. When returning from automatic neutral control, the transfer clutch control unit temporarily releases and then re-engages the transfer clutch, during a period from start to completion of engaging of the automatic neutral clutch.

12 Claims, 3 Drawing Sheets

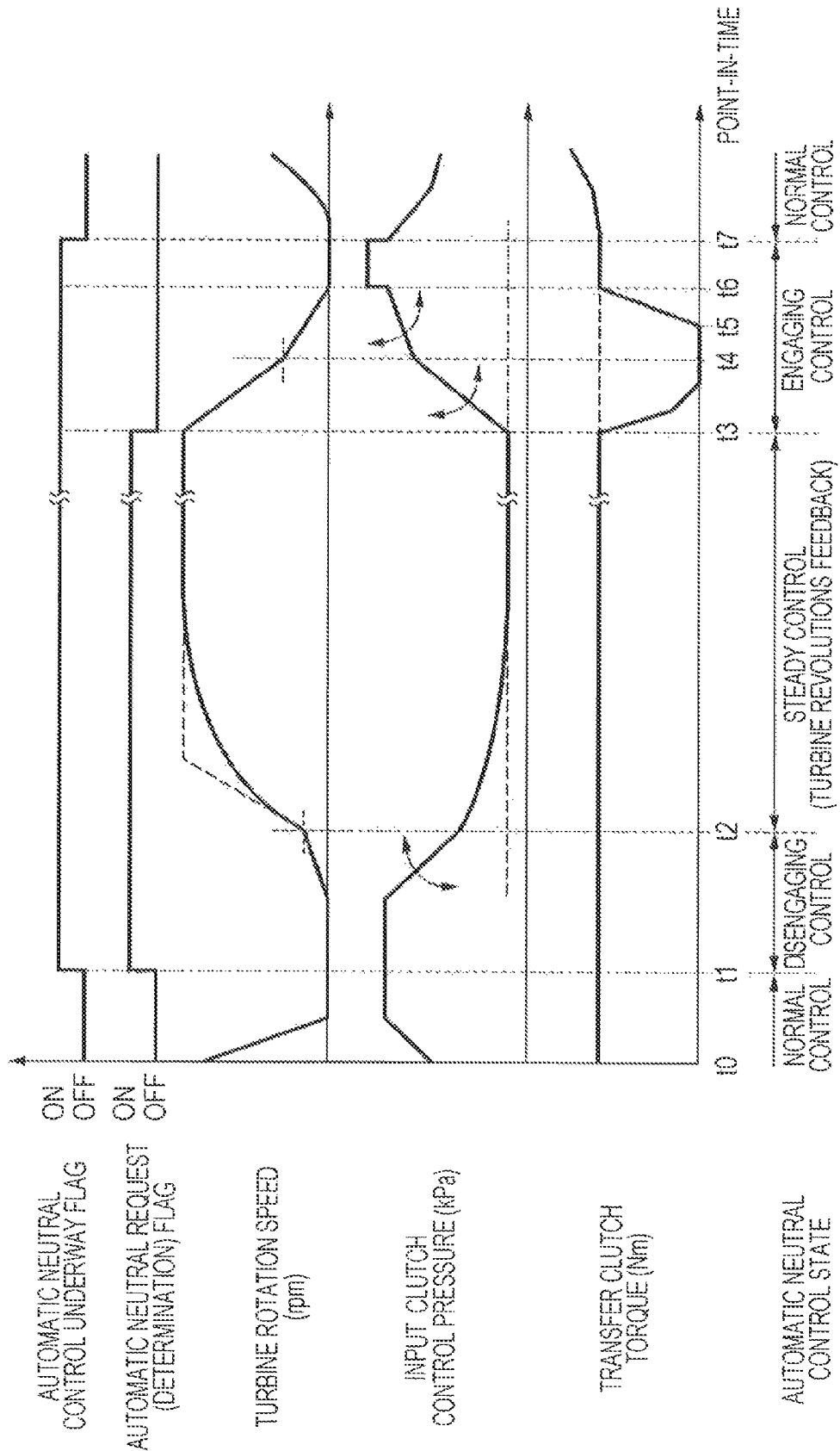

POWER TRAIN CONTROL DEVICE

CROSS-REFERENCE TO RELATED APPLICATIONS

The present application claims priority from Japanese Patent Application No. 2013-253539 filed on Dec. 6, 2012, the entire contents of which are hereby incorporated by reference.

BACKGROUND

1. Technical Field

The present invention relates to a power train control device, and more particularly relates to a power train control device for a part-time all-wheel drive (AWD) vehicle equipped with an automatic transmission which has an automatic neutral function.

2. Related Art

Conventionally, there has been known technology so called automatic neutral control in which, when the shift position of a vehicle is in the drive (D) range (drive position) but the throttle is generally full-open and the vehicle is stopped due to the brake pedal being applied, for example, the automatic transmission is placed in a neutral state to improve fuel consumption (see Japanese Unexamined Patent Application Publication No. 2005-83492). This automatic neutral control is realized by a half-engaged state (half clutch state) of a driving clutch (clutch for automatic neutral control).

Also, there have conventionally been known two types of AWD: one is full-time AWD, and the other is part-time AWD which can switch between two-wheel drive and four-wheel drive as necessary. Full-time AWD realizes four-wheel drive by providing a center differential between the front wheels and rear wheels, so as to permit differential driving of the front and rear wheels. On the other hand, part time AWD vehicles have, for example, main drive wheels directly linked to the engine, and driven wheels (sub-drive wheels) connected to the engine via a transfer clutch. This configuration allows switching between two-wheel drive and A our-wheel drive through adjustment of distribution of driving force to the driven wheels, by controlling the engaging force of the transfer clutch according to road conditions, driving state, and so forth.

In the case where automatic neutral control is applied to a part-time AWD vehicle having an automatic transmission, juddering may occur at the time of returning from automatic neutral control, i.e., when the driving clutch (clutch for automatic neutral control) is engaged. There has been demand for reduction of this juddering.

Upon diligent study of the aforementioned problem, the present inventor has found that at the time of returning from automatic neutral control in part-time AWD vehicles, vibrations at the time of engaging the driving clutch (clutch for automatic neutral control) are propagated to the driving system of the driven wheels as well, and these vibrations shake the entire power train (the entire vehicle), resulting in juddering when returning from automatic neutral control.

SUMMARY OF THE INVENTION

The present invention has been made in light of the above-described problem, and accordingly it is an object thereof to provide a power train control device for a part-time AWD vehicle equipped with an automatic transmission which has an automatic neutral function, capable of controlling juddering when returning from automatic neutral control.

An aspect of the present invention provides a power train control device for a part-time all wheel drive vehicle equipped with an automatic transmission having an automatic neutral function. The power train control device includes: an automatic neutral clutch that adjusts driving force which is transmitted from an engine to a transmission mechanism constituting the automatic transmission; a transfer clutch that adjusts driving force which is transmitted from the transmission mechanism constituting the automatic transmission to a driven-wheel driving system component which drives driven-wheels; an automatic neutral clutch control unit that releases the automatic neutral clutch in the case where predetermined automatic neutral control conditions are satisfied; and a transfer clutch control unit that controls engaging force of the transfer clutch based on a running state of the vehicle. At the time of returning from automatic neutral control, the transfer clutch control unit temporarily releases and then re-engages the transfer clutch during a period from start to completion of engaging of the automatic neutral clutch.

The transfer clutch control unit may release the transfer clutch in a period from engaging of the automatic neutral clutch starting until torque transmission to the transmission mechanism is enabled, and after torque transmission to the transmission mechanism is enabled, the transfer clutch control unit completes engaging of the transfer clutch by the time engaging of the automatic neutral, clutch is completed.

The transfer clutch control unit may release the transfer clutch at the greatest of slopes that allow response until the torque capacity of the transfer clutch becomes substantially zero, and thereafter release the transfer clutch at the lowest of slopes whereby the transfer clutch torque can be released, until the automatic neutral clutch can hold torque capacity.

The power train control device may further include a torque converter disposed between the engine and the automatic neutral clutch. In the case where the number of revolutions of a turbine liner constituting the torque converter drops below a predetermined value during engaging of the automatic neutral clutch, the automatic neutral clutch control unit lowers the slope of increasing the engaging pressure of the automatic neutral clutch.

The transfer clutch control unit may engage the transfer clutch after the number of revolutions of the turbine liner constituting the torque converter drops to the predetermined value or lower, during engaging of the automatic neutral clutch.

BRIEF DESCRIPTION OF THE DRAWINGS

FIG. 3 is a timing chart illustrating change in input clutch control pressure, transfer clutch torque, and so forth, upon returning from automatic neutral control.

DETAILED DESCRIPTION

Figure 1:
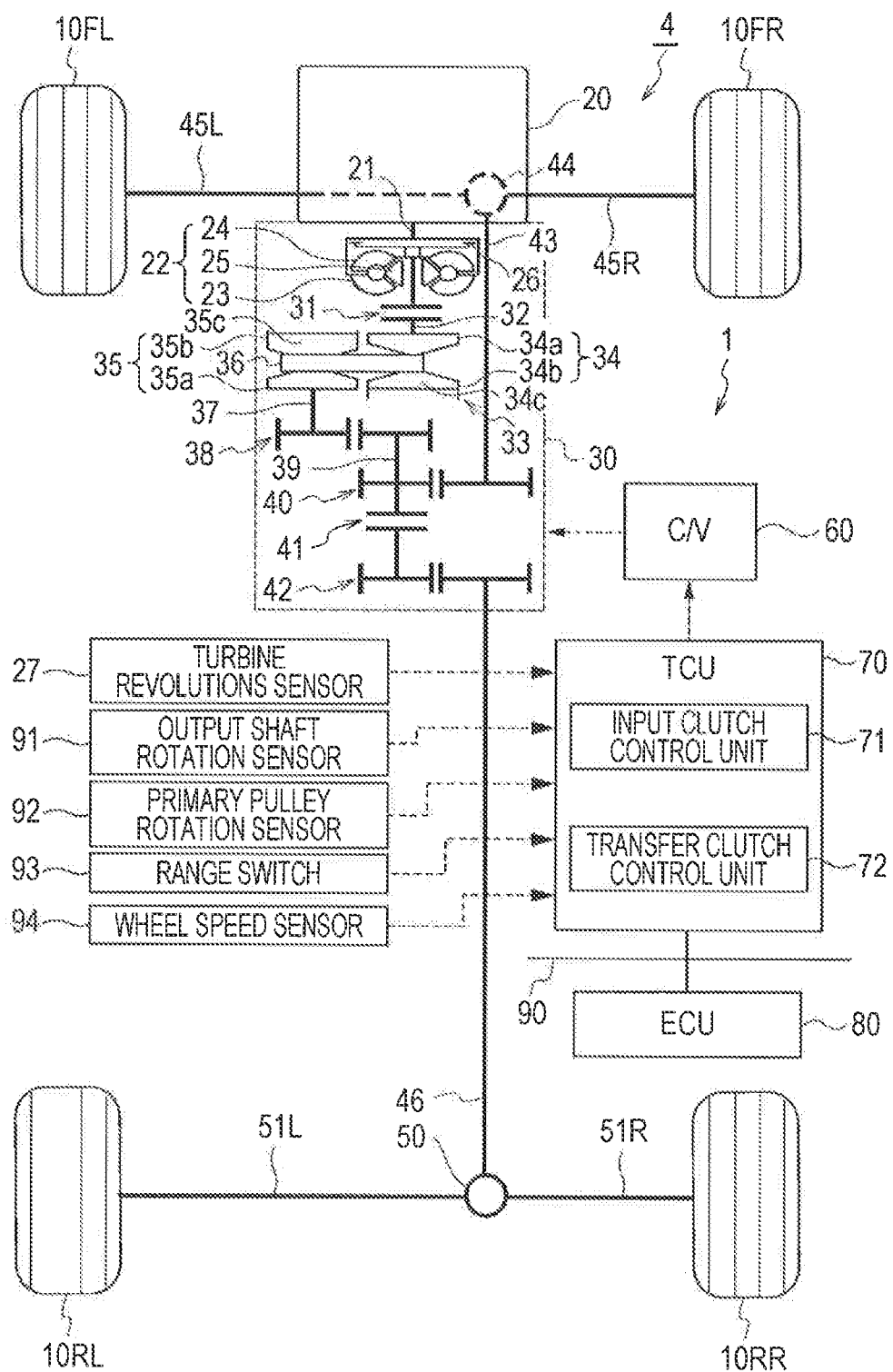
FIG. 1 is a block diagram illustrating the configuration of a power train and a driving force transmission system of an AWD vehicle equipped with a power train control device according to an implementation of the present invention.

An implementation of the present invention will be described in detail with reference to the drawings. Components which are the same or equivalent in multiple drawings are denoted with the same reference numerals. The same components in the drawings are denoted with the same reference numerals, and redundant description thereof will be omitted.

First, the configuration of a power train control device 1 according to the implementation will be described with reference to FIG. 1. FIG. 1 is a block diagram illustrating the configuration of a power train and a driving force transmission system of an AWD vehicle 4 equipped with the power train control device 1 according to the implementation. The AWD vehicle 4 according to the implementation is a part-time AWD vehicle including a continuously variable transmission (CVT) 30 having an automatic neutral function. In particular, the AWD vehicle 4 is a front-engine-front-drive (SF) based part-time AWD vehicle.

An engine 20 is a horizontally-opposed four-cylinder gasoline engine, as an example. The continuously variable transmission 30 (serving as the automatic transmission of the present invention), which converts and outputs driving force from the engine 20 via a torque converter 22 which has clutch function and torque amplifying functions, is connected to an output shaft (crankshaft) 21 of the engine 20.

The torque converter 22 mainly includes a pump impeller 23, a turbine liner 24, and a stator 25. The pump impeller 23, which is connected to the output shaft 21, generates oil flow, and the turbine liner 24 disposed facing the pump impeller 23 receives the power of the engine 20 through the oil, so as to drive the output shaft. The stator 25, which is interposed between the two, rectifies the discharge flow (return) from the turbine liner 24 and returns this to the pump impeller 23, thus realizing the torque amplifying effect. The torque converter 22 also includes a lock-up clutch 26 that places the input and output in a directly coupled state. When the lock-up clutch 26 is in a non-lock-up state, the torque converter 22 amplifies the torque of the driving force of the engine 20, and transmits to the continuously variable transmission 30. When the lock-up clutch 26 is in a lock-up state, the torque converter 22 directly transmits the driving force of the engine 20 to the continuously variable transmission 30. The number of revolutions of the turbine liner 24 (turbine revolution number), which constitutes the torque converter 22, is detected by a turbine revolution sensor 27. The detected turbine revolution number is output to a later-described transmission control unit (TCU) 70.

The continuously variable transmission 30 automatically and steplessly chances its gear ratio in accordance with the running state of the vehicle. The continuously variable transmission. 30 is connected to the output shaft of the torque converter 22, and has an input clutch 31 (serving as the automatic neutral clutch of the present invention) which is connected to the output shaft of the torque converter 22, and which is capable of adjusting driving force transmitted from the torque converter 22 to the continuously variable transmission 30 and placing the continuously variable transmission. 30 in a neutral state. A transmission mechanism 33 is provided on the output shaft (primary shaft) 32 of this input clutch 31.

The input clutch 31 adjusts the engaging force according to the oil pressure supplied thereto, thereby adjusting the driving force transmitted to the continuously variable transmission 30 (transmission mechanism 33). Specifically, when the pressing force of the supplied oil pressure exceeds the pressing force of a clutch spring, the input clutch 31 is engaged, and when the pressing force of the supplied oil pressure is smaller than the pressing force of the clutch spring, the input clutch 31 is released. Upon engagement of the input clutch 31, the driving force of the torque converter 22 is transmitted to the transmission mechanism 33. Upon release of the input clutch 31, transmission of driving force to the torque converter 22 is cut off. In the case where predetermined operating conditions are satisfied in a state where the select lever is set to the drive (D) range, the input, clutch 31 restricts the driving force transmitted form the torque converter 22 to the transmission mechanism 33 (a half-clutch state), thus creating a pseudo-neutral state.

The transmission mechanism 33 includes a primary shaft 32 connected to the Input clutch 31, and a secondary shaft 37 disposed in parallel with the primary shaft 32. The primary shaft 32 is provided with a primary pulley 34. The primary pulley 34 includes a fixed sheave 34a which is affixed to the primary shaft 32, and a movable sheave 34h which is slidably movable in the axial direction of the primary shaft 32 in relation to the fixed sheave 34a, so that the spacing between the conical faces of the sheaves 34a and 34b, i.e., the pulley groove width, can be changed. On the other hand, the secondary shaft 37 includes a secondary pulley 35. The secondary pulley 35 includes a fixed sheave 35a which is affixed to the secondary shaft 37, and a movable sheave 35b which is slidably movable in the axial direction of the secondary shaft 37 in relation to the fixed sheave 35a, so that the pulley groove width can be changed.

A chain 36 wound around the primary pulley 34 and the secondary pulley 35 to transmit driving force. The gear ratio is steplessly changed by changing the groove widths of the primary pulley 34 and secondary pulley 35 by changing the ratio of the chain loop radius of the chain. 36 riding on the pulleys 34 and 35 (pulley ratio).

Now, a hydraulic chamber 34c is formed in the primary pulley 34 (movable sheave 34b), and a hydraulic chamber 35c is formed in the secondary pulley 35 (movable sheave 35b). The groove widths of the primary pulley 34 and secondary pulley 35 are set and changed by adjusting primary of pressure introduced to the hydraulic chamber 34c of the primary pulley 34 and secondary oil pressure introduced to the hydraulic chamber 35c of the secondary pulley 35.

The secondary shaft 37 of the transmission mechanism 33 is connected to a counter shaft. 39 via reduction gears 38 made up of a pair of gears (reduction drive gear and reduction driven gear). The driving force converted at the transmission mechanism 33 is transmitted to the counter shaft 39 through the reduction gears 38. The counter shaft 39 is connected to a front drive shaft 43 via counter gears 40 made up of a pair of gears (counter drive gear and counter driven gear). The driving force transmitted to the counter shaft 39 is transmitted to a front differential 44 via the counter gears 40 and front drive shaft 43. The front differential 44 is a beveled gear type differential device, for example. The driving force from the front differential 44 is transmitted to a left front wheel 10FL via a left front driveshaft 45L, and also transmitted to a right front wheel 10FR via a right front driveshaft 45R.

On the other hand, a transfer clutch 41 which adjusts the driving force transmitted to a rear differential 50 is interposed downstream of the counter gears 40 (counter drive gear) on the above-described counter shaft 39. The transfer clutch 41 controls the engaging force thereof (i.e., torque distribution to rear wheels 10RL and 10RR (serving as the driven wheels of the present invention) herein) according to the four-wheel driving state (e.g., the slipping state of the front wheels 10FL and 10FR, etc.), engine torque, and so forth. Accordingly, the driving force transmitted to the counter shaft 39 is distributed according to the engaging force of the transfer clutch 41, and thus is also transmitted to the rear wheels 10RL and 10RR.

More specifically, the rear end of the counter shaft 39 is connected to a propeller shaft 46 extending toward the back side of the vehicle, via transfer gears 42 made up of a pair of gears (transfer drive gear and transfer driven gear). Accordingly, the driving force is transmitted to the counter shaft 39 and adjusted (distributed) by the transfer clutch. 41 is transmitted from the transfer gears 42 (transfer driven gear) to the rear differential 50 via the propeller shaft 46.

A left rear wheel driveshaft 51L and a rig rear wheel driveshaft 51R are connected to the rear differential 50. The driving force from the rear differential 50 is transmitted to a left rear wheel 10RL via the left rear wheel driveshaft 51L, and to a right rear wheel 10RR via the right rear wheel driveshaft 51R.

According to the above-described configuration of the power train driving force transmission system, in the case where the select lever has been moved to the D range, for example, the input clutch 31 is engaged, and the engine driving force is input to the primary shaft 32 of the continuously variable transmission 30. The driving force converted by the continuously variable transmission 30 is output from the secondary shaft 37, and transmitted to the front drive shaft 43 via the reduction gears 38, counter shaft 39, and counter gears 40. The driving force is distributed to the left and right by the front differential 44, and thus transmitted to the left and right front wheels 10FL and 10FR. Accordingly, the left and right front wheels 10FL and 10FR are continuously driven when the AWD vehicle 4 is in a running state.

On the other hand, part of the driving force transmitted to the counter shaft 39 is transmitted to the propeller shaft 46 via the transfer clutch 41 and transfer gears 42. Upon a predetermined clutch torque being applied to the transfer clutch 41, the driving force distributed according to that clutch torque is output to the propeller shaft 46. The driving force is then also transmitted to the rear wheels 10RL and 10RR via the rear differential 50. Accordingly, the functions of a FT based part-time AWD vehicle are manifested in the AWD vehicle 4.

Oil, pressure to change the continuously variable transmission 30, which is the above-described primary oil pressure and secondary oil pressure, is controlled by a valve body (control valve) 60. The valve body 60 adjusts oil pressure of oil discharged from an oil pump by opening and closing an oil, passage formed within the valve body 60, using a spool valve and a solenoid valve (electromagnetic valve) to move the spool valve. The valve body 60 thus provides the hydraulic chamber 34c of the primary pulley 34 and the hydraulic chamber 35c of the secondary pulley 35 with oil, pressure. The valve body 60 adjusts the oil pressure discharged from the oil pump by opening and closing the of passage formed within the valve body 60 in the same way, thereby supplying oil pressure to engage/disengage each of the input clutch 31 and transfer clutch 41.

The shift control of the continuously variable transmission 30 is performed by the TCU 70. The TCU 70 controls the driving of the solenoid valve (electromagnetic valve) of the aforementioned valve body 60, thereby adjusting the oil pressure supplied to the hydraulic chamber 34c of the primary pulley 34 and the hydraulic chamber 35c of the secondary pulley 35 so as to change the pear ratio of the continuously variable transmission 30. The TCU 70 also controls the driving of the solenoid valve of the aforementioned valve body 60, thereby adjusting the oil pressure supplied to the input clutch 31 and transfer clutch 41, thus adjusting the engaging force of the input clutch 31 and the distribution ratio of driving force transmitted to the rear wheels 10RL and 10RR. Further, the TCU 70 suppresses juddering when returning from automatic neutral control, by collaboratively controlling the input clutch 31 and transfer clutch 41.

The TCU 70 is communicably connected to an engine control unit (ECU) 80 that centrally controls the engine, via a controller area network (CAN) 90. The TCU 70 receives information such as engine rotations, accelerator pedal position, engine torque, and vehicle speed, which are transmitted from the ECU 80 via the CAN 90. The TCU 70 also receives information such as brake pedal depressing state (brake switch state), and steering angle, via, the CAN 90.

An output shaft rotation sensor (vehicle speed sensor) 91 and a primary pulley rotation sensor 92 are also connected to the TCU 70. The output shaft rotation sensor 91 is attached near the output shaft of the continuously variable transmission 30 (secondary shaft 37) and detects the number of revolutions of the output shaft. The primary pulley rotation sensor 92 detects the number of revolutions of the primary pulley 34. Further, a range switch. 93 and four wheel speed sensors 94 are connected to the TCU 70. The range switch 93 detects the selected position of the shift lever. The four wheel, speed sensors 91 detect the rotating state of each of the wheels 10FL, 10FR, 10RL, and 10RR.

The TCU 70 includes a microprocessor which performs computations, read only memory (ROM) that stores storing programs, a gearshift map, and so forth, with which the microprocessor executes the various processes, random-access memory (RAM) that stores various types of data such as computation results, a backup RAM that holds the stored contents by way of a 12-V battery, an input/output interface.

The TCU 70 refers to the gearshift map to steplessly and automatically change the gear ratio in accordance with the running state of the vehicle (e.g., accelerator pedal position, vehicle speed, engine speed). As described above, the gearshift map is stored in the ROM within the TCU 70.

The TCU 70 executes automatic neutral control and transfer clutch control (AWD control) based on the various types of information obtained from the various types of sensors and the like mentioned above. The TCU 70 also has a function to control the oil pressure of the transfer clutch 41 so as to suppress juddering at the time of returning from automatic neutral control. To this end, the TCU 70 functionally includes an input clutch control unit 71 and transfer clutch control unit 72. The TCU 70 realizes the functions of the input clutch control unit. 71 and the transfer clutch control unit 72 by the programs stored in the ROM which are executed by the microprocessor.

In the case where predetermined automatic neutral control conditions are satisfied, the input clutch control unit 71 disengages the input clutch 31. Thus, the input clutch control unit 71 serves as the automatic neutral clutch control unit of the present invention. More specifically, the input clutch control unit 71 calculates differential rotation speed Net as the difference between engine speed Ne and turbine rotation speed Nt, and controls the input clutch 31 so chat the differential rotation speed Net converges within a target differential rotation, speed Ntg, if the following conditions are satisfied: the brake switch is on (the brake pedal is being depressed); the accelerator opening is smaller than an accelerator opening determination threshold (the accelerator pedal is released); the vehicle speed is smaller than a vehicle stop determination threshold (the vehicle is stopped); and the select lever is set to the drive range (i.e., other than the park (P) and neutral (N) ranges). The input clutch control unit 71 thus sets the input clutch 31 to a half-engaged state (half clutch state).

On the other hand, in the case where one or more of the automatic neutral control conditions are unsatisfied, the input clutch control unit 71 stops the automatic neutral control (releases the input clutch 31). Note that at the time of engaging the input clutch 31 which had been released, i.e., during engaging of the input clutch 31 (while increasing engaging force), if the number of revolutions of the turbine liner 24)

constituting the torque converter 22 is higher than a predetermined value, the engaging force of the input, clutch 31 is increased at a relatively steep slope. If the number of revolutions of the turbine liner 24 no longer exceeds the predetermined value, the slope of increasing the engaging pressure of the input clutch 31 (increasing angle) is lowered. This is performed to reduce the final engaging shock.

The transfer clutch control, unit 72 controls the engaging force of the transfer clutch 41 (i.e., distribution ratio of driving force to the rear wheels 10RL and 10RR) based on the driving state of the AWD vehicle 4 (e.g., driving state of the four wheels, engine torque, etc.), in real time. Thus, the transfer clutch control unit 72 serves as the transfer clutch control unit of the present invention.

In particular, at the time of returning from automatic neutral control, the transfer clutch control unit 72 temporarily releases and then re-engages the transfer clutch 41 during the period from start to completion of the engaging operation of the input clutch 31.

More specifically, in the period from the engaging operation of the input clutch 31 starting until torque transmission to the transmission mechanism 33 by the input clutch 31 is enabled, the transfer clutch control unit 72 releases the transfer clutch 41, and after torque transmission to the transmission mechanism 33 is enabled, the transfer clutch control unit 72 completes engaging of the transfer clutch 41, i.e., increases the transfer clutch torque to a functionally necessary level by the time that engaging of the input clutch 31 is completed (e.g., by the time that the transmission torque capacity and the clutch torque capacity become approximately the same). At this time, the transfer clutch control unit 72 releases the transfer clutch 41 at a hydraulic response bound slope (the greatest of slopes that allow response) until the torque capacity of the transfer clutch 41 becomes substantially zero and the piston stroke becomes substantially zero. Thereafter, the transfer clutch 41 is released at the lowest of slopes whereby the transfer clutch torque can be released until the input clutch 31 can hold torque capacity.

The transfer clutch control unit 72 also engages the transfer clutch 41 after the number of revolutions of the turbine liner 24 constituting the torque converter 22 reaches to or below the predetermined value while engaging the input clutch 31 (while engaging pressure is increasing).

Figure 2:
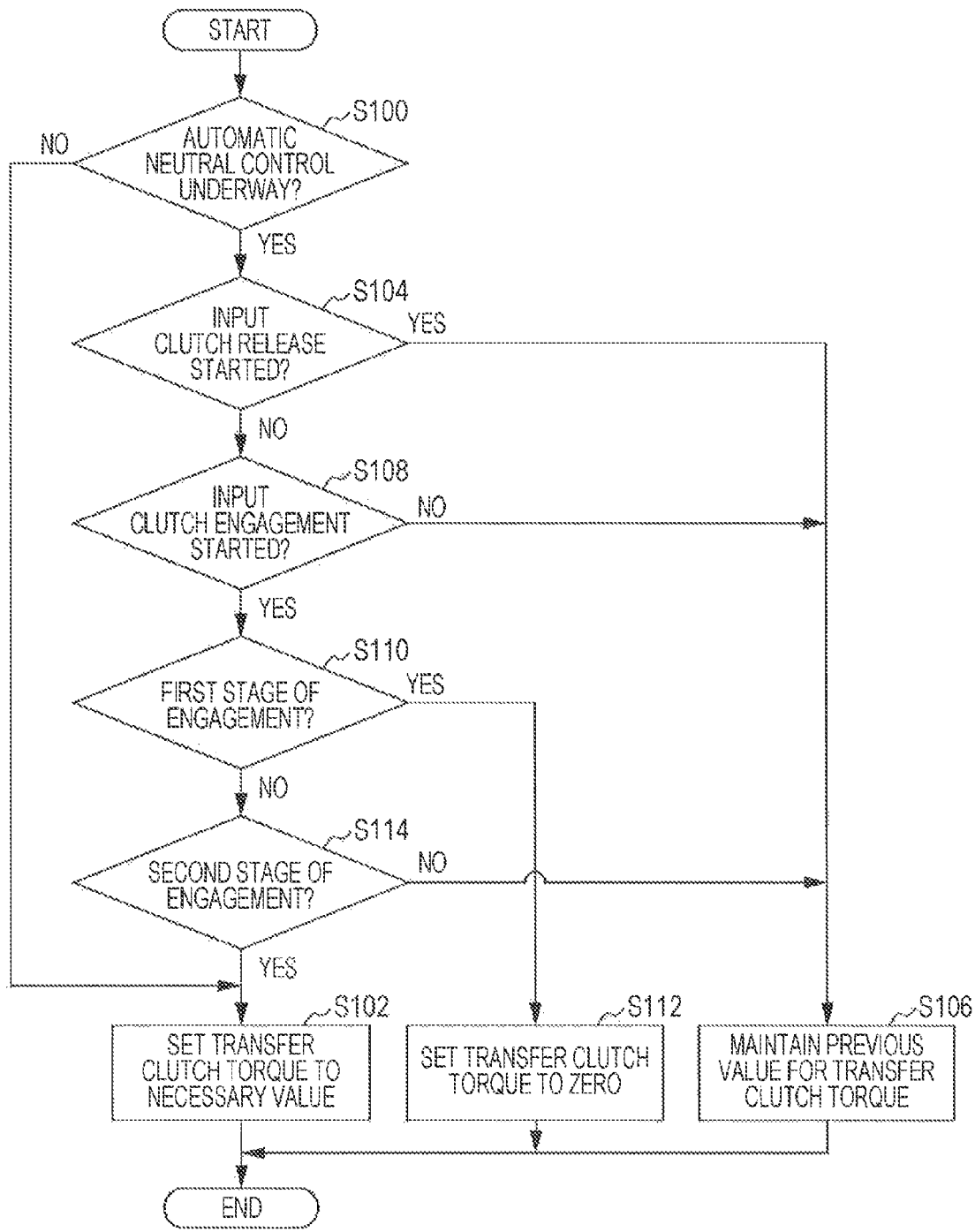
FIG. 2 is a flowchart illustrating processing procedures for automatic neutral control by the power train control device according to the implementation.

Next, the operations of the power train control device 1 will be described with reference to FIG. 2. FIG. 2 is a flowchart illustrating processing procedures for automatic neutral control by the bower train control device 1 according to the implementation. This processing is repeatedly executed at the TCU 70 at predetermined times.

In step S100, determination is made regarding whether or not automatic neutral control is being performed. In the case where automatic neutral control is being performed, the flow advances to step S104. On the other hand, in the case where automatic neutral control is not being performed, the flow advances to step S102.

In step S102, a necessary value (Nm) is set for the transfer clutch torque, based on the running state of the AND vehicle 4. This corresponds to point-in-time t0 to t1 , and point-in-time t7 and thereafter, in FIG. 3 which will be described later. Thereafter, the flow ends.

In the case where automatic neutral control is being performed, in step S104 determination is made regarding whether or not releasing of the input clutch. 31 has been started. In the case where releasing of the input clutch 31 has been not started, the flow advances to step S108. On the other hand, in the case where releasing of the input clutch 31 has been started, the flow advances to step S106.

In step S106, a previous value is held (set) as the transfer clutch torque. This corresponds to point-in-time t1 to t2 in FIG. 3 which will be described later. Thereafter, the flow ends.

In the case where releasing of the input clutch 31 has been not started, in step 3108, determination is made regarding whether or not engaging of the input clutch 31 has been started. In the case where engaging of the input clutch 31 has not been started, in step 3106, a previous value is held (set) as the transfer clutch torque, and thereafter the flow ends. This corresponds to point-in-time t2 to t3 in FIG. 3 which will be described later. On the other hand, in the case where releasing of the input clutch 31 has been started, the flow advances to step S110.

In step S110, determination is made regarding whether or not a first stage of engagement is being performed (whether or not the turbine revolution number is a predetermined value or higher), based on the turbine revolution number of the torque converter 22. In the case of the first stage of engagement (the turbine revolution number is the predetermined value or higher), the flow advances to step 3112. On the other hand, in the case where the first stage of engagement is being not performed (the turbine revolution number is lower than the predetermined value), the flow advances to step S114.

In step S112, substantially zero (Nm) is set as the transfer clutch torque. Specifically, the transfer clutch 41 is released. This corresponds to point-in-time t3 to t4 in FIG. 3 which will be described later. Thereafter, the flow ends.

In step S114, determination is made regarding whether or not the second stage of engagement is being performed (whether or not a predetermined amount of time has elapsed after the turbine revolution number fell below the predetermined value). In the case where the second stage of engagement is not being performed (the pre determined amount of time has not elapsed after the turbine revolution number fell below the predetermined value), in step 106, a previous value is held (set) as the transfer clutch torque. Thereafter, the flow ends. This corresponds to point-in-time t4 to t5 in FIG. 3 which will be described later.

On the other hand, in the case of the second stage of engagement (a predetermined amount of time has elapsed after the turbine revolution number fell below the predetermined value), the flow advances to step 3102. In step 3102, a necessary value (Nm) is set as the transfer clutch torque based on the running state of the AWD vehicle 4. This corresponds to point-in-time t5 to t6 in FIG. 3 which will be described later. Specifically, the transfer clutch 41 is reengaged, after which the flow ends. Thus, at the time of returning from automatic neutral control, the transfer clutch 41 is temporarily released and then re-engaged during the period from start to completion of the engaging operation of the input clutch 31.

FIG. 3 is a timing chart illustrating change in clutch control pressure, transfer clutch torque, and so forth, while the processing procedures of the above-described flowchart are executed. In FIG. 3, the horizontal axis represents point-in-time, and an automatic neutral control underway flag, automatic neutral control request (determination) flag, turbine rotation speed, input clutch control pressure, and transfer clutch torque are illustrated in that order from above.

First, during point-in-time t0 to t1 , the automatic neutral request (determination) flag and automatic neutral control underway flag are off. Accordingly, at point-in-time t0 to t1 , the automatic neutral control is in a normal control state, and the input clutch 31 is in an engaged state. The transfer clutch 41 also is in an engaged state (necessary clutch torque according to running state).

Next, at point-in-time t1, upon the predetermined automatic neutral control conditions being satisfied, the automatic neutral request (determination) flag changes from off to on, and the automatic neutral control underway flag chancing from off to on, the automatic neutral control is started (i.e., releasing operation of the input clutch 31 is started). Accordingly, during point-in-time t1 to t2, performing the disengaging control of the input clutch 31 reduces the control pressure of the input clutch 31, and the input clutch 31 is released. Releasing of the input, clutch 31 (reduction in control pressure) is accompanied by increase in the turbine rotation speed of the torque converter 22. Note that the transfer clutch 41 remains in an engaged state (necessary clutch torque).

In the subsequent period of point-in-time t2 to t3, the automatic neutral control enters a steady control state (feedback control state based on turbine rotations). Specifically, the oil, pressure of the input clutch 31 is controlled such that the differential rotation speed. Net, which is the difference between engine speed Ne and turbine rotation speed Nt, converges within the target differential rotation speed Ntg. As a result, the input clutch 31 is held to a half-engaged state (half clutch state). Note that the transfer clutch. 41 remains in an engaged state (necessary clutch torque).

Next, at point-in-time t3, upon the predetermined automatic neutral control conditions no longer being satisfied, and the automatic neutral request (determination) flag changing from on to off, at point-in-time t3 to t4 to t5 to t6, and t7, engaging control of the input, clutch 31 is performed. First, in a period till the turbine revolution number drops to below the predetermined threshold (point-in-time t3 to t4; first stage), engaging operations of the input clutch 31 are started. On the other hand, the transfer clutch. 41 is released until torque transmission to the transmission mechanism 33 side by the input clutch 31 is enabled. More specifically, the transfer clutch. 41 is released at a hydraulic response bound slope (the greatest of slopes that allows response) until the torque capacity of the transfer clutch 41 is generally zero and the piston stroke substantially zero. Thereafter, the transfer clutch 41 is released at the lowest of slopes whereby the transfer clutch torque can be released until the input clutch 31 can hold torque capacity.

Next, after the turbine revolution number of the torque converter 22 drops to below the predetermined threshold (point-in-time t4 to t5 to t6; second stage), the slope of increasing the engaging pressure (oil pressure) of the input clutch 31 (increasing angle) is lowered than the slope of the above-described first stage, and the control pressure of the input clutch 31 is increased at this low slope. On the other hand, in the case where the turbine revolution number reaches or exceeds the predetermined threshold, the transfer clutch 41 is engaged after a predetermined delay time (point-in-time t4 to t5). Specifically, after transmission of torque to the rear wheels 10RL and 10RR is enabled, the engaging of the transfer clutch 41 is completed by the time engaging of the input clutch 31 is completed.

Then in point-in-time t7, when the automatic neutral control underway flag becomes off, the control state of the input clutch 31 is returned to the normal control. The transfer clutch 41 also is controlled to an engaged state (necessary clutch torque).

As described above in detail, according to the implementation, at the time of returning from automatic neutral control, the transfer clutch 41 is temporarily released and then re-engaged during the period from start to completion of the engaging operation of the input clutch 31. Accordingly, juddering from clutch engagement at the time of returning from automatic neutral control can be suppressed from being transmitted to the rear wheels 10RL and 10RR. As a result, juddering at the time of returning from automatic neutral control can be suppressed.

According to the implementation, in the period from start of the engaging operation of the input clutch 31 until torque transmission to the transmission mechanism 33 by the input clutch 31 is enabled, the transfer clutch 41 is released, and after transmission of torque to the rear wheels 10RL and 10RR is enabled, the engaging of the transfer clutch 41 is completed by the time engaging of the input clutch 31 is completed. Accordingly, the transfer clutch torque is reduced before the input clutch 31 heads toward engaging and torque transmission to the transmission mechanism 33 is enabled. Also, the transfer clutch torque is increased before the input clutch 31 is completely engaged. Accordingly, the AWD vehicle 4 can start moving without loss of AWD performance, while reliably suppressing juddering from clutch engagement at the time of returning from automatic neutral from being transmitted to the rear wheels 10RL and 10RR.

According to the implementation, transfer clutch 41 is released at a hydraulic response bound slope the greatest of slopes that allow response) until the torque capacity of the transfer clutch 41 becomes substantially zero and the piston stroke becomes substantially zero, and thereafter the transfer clutch 41 is released at the lowest slopes whereby the transfer clutch torque can be released until the input clutch 31 can hold torque capacity. Accordingly, the engaging of the transfer clutch 41 can be quickly and smoothly disengaged to where the input clutch 31 has torque capacity.

In the implementation, if the turbine revolution number of the torque converter 22 drops below the predetermined value, the slope of increasing the engaging pressure of the input clutch 31 (increasing angle) is lowered. Accordingly, the engaging pressure of the input clutch 31 is quickly increased at a relatively steep slope until torque transmission to the rear wheels 10RL and 10RR is enabled, and after torque transmission to the rear wheels 10RL and 10RR is enabled the slope of increasing the engaging pressure is made to be lower, whereby engaging shock of the input clutch 31 can be reduced.

Also, according to the implementation, engagement of the transfer clutch 41 is performed after the turbine revolution number of the torque converter 22 drops to the predetermined value or lower. Accordingly, the engagement of the transfer clutch 41 can be performed suitably by judging a timing at which torque transmission to the rear wheels 10RL and 10RR is enabled based on the state of dropping of the turbine revolution number.

While an implementation of the present invention has been described, the present invention is not restricted to the above implementation, and various modifications may be made. For example, while the present invention has been applied to a chain type continuously variable transmission (CVT) in the above implementation, the present invention may be applied to a belt type continuously variable transmission or a toroidal continuously variable transmission as well, for example, instead of a chain type continuously variable transmission. Also, this may be applied to a stepped automatic transmission (AT) instead of a continuously variable transmission.

In the implementation described above, the input clutch 31 is positioned between the torque converter 22 and primary pulley 34, but the position of the input clutch 31 is not restricted to this, nor to any positional relation before or after other mechanism, as long as the input clutch 31 is situated on the driving force transmission path between the engine 20 and the driving wheels. Also, while the input clutch 31 is used as the clutch for automatic neutral, this is not restricted to the input clutch 31 and other clutches or the like may be used, as long as a pseudo neutral state can be created. Further, while a pneumatic transfer clutch 41 is used in the above-described implementation, a electromagnetic solenoid clutch may be used instead.

The configuration of the driving force transmission system (e.g., the layout of gears, shafts, and so forth) described above also is only exemplary, and the above implementation is not restrictive.

Further, while control of the transfer clutch 41 is performed by the TCU 70 in the above-described implementation, a configuration may be made where control is performed by a dedicated AWD controller, independent from the TCU 70.

The invention claimed is:

1. A power train control device for a part-time all wheel drive vehicle equipped with an automatic transmission having an automatic neutral function, the power train control device comprising:
   an automatic neutral clutch that adjusts driving force which is transmitted from an engine to a transmission mechanism constituting the automatic transmission;
   a transfer clutch that adjusts driving force which is transmitted from the transmission mechanism constituting the automatic transmission to a driving system component which drives driven-wheels;
   an automatic neutral clutch control unit that releases the automatic neutral clutch in the case where predetermined automatic neutral control conditions are satisfied; and
   a transfer clutch control unit that controls engaging force of the transfer clutch based on a running state of the vehicle,
   wherein, at the time of returning from automatic neutral control, the transfer clutch control unit temporarily releases and then re-engages the transfer clutch during a period from start to completion of engaging of the automatic neutral clutch.

2. The power train control device according to claim 1, wherein, the transfer clutch control unit releases the transfer clutch in a period from engaging of the automatic neutral clutch starting until torque transmission to the transmission mechanism is enabled, and after torque transmission to the transmission mechanism is enabled, the transfer clutch control unit completes engaging of the transfer clutch by the time engaging of the automatic neutral clutch is completed.

3. The power train control device according to claim 1, wherein the transfer clutch control unit releases the transfer clutch at a greatest of slopes that allows response until the torque capacity of the transfer clutch becomes substantially zero, and thereafter releases the transfer clutch at a lowest of slopes whereby the transfer clutch torque can be released, until the automatic neutral clutch can hold torque capacity.

4. The power train control device according to claim 2, wherein the transfer clutch control unit releases the transfer clutch at a greatest of slopes that allows response until the torque capacity or the transfer clutch becomes substantially zero, and thereafter releases the transfer clutch at a lowest of slopes whereby the transfer clutch torque can be released, until the automatic neutral clutch can hold torque capacity.

5. The power train control device according to claim 1, further comprising:
   a torque converter disposed between the engine and the automatic neutral clutch;
   wherein, in the case where a number of revolutions of a turbine liner constituting the torque converter drops below a predetermined value during engaging of the automatic neutral clutch, the automatic neutral clutch control unit lowers a slope of increasing the engaging pressure of the automatic neutral clutch.

6. The power train control device according to claim 2, further comprising:
   a torque converter disposed between the engine and the automatic neutral clutch;
   wherein, in the case where a number of revolutions of a turbine liner constituting the torque converter drops below a predetermined value during engaging of the automatic neutral clutch, the automatic neutral clutch control unit lowers a slope of increasing the engaging pressure of the automatic neutral clutch.

7. The power train control device according to claim 3, further comprising:
   a torque converter disposed between the engine and the automatic neutral clutch;
   wherein, in the case where a number of revolutions of a turbine liner constituting the torque converter drops below a predetermined value during engaging of the automatic neutral clutch, the automatic neutral clutch control unit lowers a slope of increasing the engaging pressure of the automatic neutral clutch.

8. The power train control device according to claim 4, further comprising:
   a torque converter disposed between the engine and the automatic neutral clutch;
   wherein, in the case where a number of revolutions of a turbine liner constituting the torque converter drops below a predetermined value during engaging of the automatic neutral clutch, the automatic neutral clutch control unit lowers a slope of increasing the engaging pressure of the automatic neutral clutch.

9. The power train control device according to claim 5, wherein the transfer clutch control unit engages the transfer clutch after the number of revolutions of the turbine liner constituting the torque converter drops to the predetermined value or lower, during engaging of the automatic neutral clutch.

10. The power train control device according to claim 6, wherein the transfer clutch control unit engages the transfer clutch after the number of revolutions of the turbine liner constituting the torque converter drops to the predetermined value or lower, during engaging of the automatic neutral clutch.

11. The power train control device according to claim 7, wherein the transfer clutch control unit engages the transfer clutch after the number of revolutions of the turbine liner constituting the torque converter drops to the predetermined value or lower, during engaging of the automatic neutral clutch.

12. The power train control device according to claim 8, wherein the transfer clutch control unit engages the transfer clutch after the number of revolutions of the turbine liner constituting the torque converter drops to the predetermined value or lower, during engaging of the automatic neutral clutch.

* * * * *